United States Patent
Kye et al.

(10) Patent No.: US 8,755,013 B2
(45) Date of Patent: Jun. 17, 2014

(54) LIQUID CRYSTAL DISPLAY DEVICE AND METHOD OF MANUFACTURING THE SAME

(75) Inventors: Myeong-Ha Kye, Seoul (KR); Jun-Hyup Lee, Seoul (KR); Jae-Jin Lyu, Yongin-si (KR); Seung-Beom Park, Seoul (KR); Jong-Ho Son, Seoul (KR); Ji-Won Sohn, Seoul (KR); Hoon Kim, Ansan-si (KR); Min-Goo Seok, Yongin-si (KR); Jun-Hee Na, Asan-si (KR); Min-Jae Kim, Suwon-si (KR); Su-Han Woo, Asan-si (KR)

(73) Assignee: Samsung Display Co., Ltd. (KR)

( * ) Notice: Subject to any disclaimer, the term of this patent is extended or adjusted under 35 U.S.C. 154(b) by 607 days.

(21) Appl. No.: 12/418,718

(22) Filed: Apr. 6, 2009

(65) Prior Publication Data

US 2010/0103357 A1  Apr. 29, 2010

(30) Foreign Application Priority Data

Oct. 29, 2008 (KR) .................. 10-2008-0106521

(51) Int. Cl.
*G02F 1/1337* (2006.01)
*B29C 65/00* (2006.01)

(52) U.S. Cl.
USPC .................. 349/123; 349/124; 156/272.2

(58) Field of Classification Search
USPC .................. 349/123, 124; 156/272.2
See application file for complete search history.

(56) References Cited

U.S. PATENT DOCUMENTS

| | | | | |
|---|---|---|---|---|
| 5,953,091 A * | 9/1999 | Jones et al. | | 349/129 |
| 7,290,076 B2 * | 10/2007 | Valenci | | 710/260 |
| 7,515,698 B2 * | 4/2009 | Van Wyk et al. | | 379/142.16 |
| 7,929,562 B2 * | 4/2011 | Petrovykh | | 370/429 |
| 8,161,171 B2 * | 4/2012 | Maes | | 709/228 |
| 2003/0048401 A1 * | 3/2003 | Hanaoka et al. | | 349/123 |
| 2003/0067565 A1 * | 4/2003 | Yamamura | | 349/65 |
| 2004/0061821 A1 * | 4/2004 | Takeda et al. | | 349/123 |
| 2007/0140299 A1 * | 6/2007 | Hofmann et al. | | 370/486 |
| 2007/0153769 A1 * | 7/2007 | Comstock et al. | | 370/352 |
| 2007/0250884 A1 * | 10/2007 | Qiu et al. | | 725/106 |
| 2008/0123603 A1 * | 5/2008 | Cai et al. | | 370/338 |
| 2008/0291347 A1 * | 11/2008 | Kim et al. | | 349/33 |
| 2009/0086147 A1 * | 4/2009 | Chen et al. | | 349/143 |
| 2010/0122281 A1 * | 5/2010 | Wang et al. | | 725/25 |
| 2011/0010459 A1 * | 1/2011 | Stokking et al. | | 709/231 |
| 2011/0023071 A1 * | 1/2011 | Li et al. | | 725/87 |
| 2011/0067081 A1 * | 3/2011 | Strom et al. | | 725/110 |

(Continued)

FOREIGN PATENT DOCUMENTS

| | | |
|---|---|---|
| JP | 07043689 A | 2/1995 |
| JP | 2001048904 A | 2/2001 |
| JP | 2004286984 A | 10/2004 |

*Primary Examiner* — Jerry Blevins
(74) *Attorney, Agent, or Firm* — Cantor Colburn LLP

(57) ABSTRACT

A liquid crystal display device includes an array substrate, an opposite substrate and a liquid crystal display layer. The array substrate includes a pixel electrode and a lower reactive mesogen layer. The pixel electrode includes a plurality of slit portions disposed on a plurality of domains in different directions. The lower reactive mesogen layer is disposed on the pixel electrode to induce an inclined direction of liquid crystal molecules. The opposite substrate includes an upper substrate. An upper reactive mesogen layer is disposed on a common electrode of the opposite substrate. The liquid crystal layer includes liquid crystal molecules arranged to have a pretilt angle between a surface of the lower reactive mesogen layer and a surface of the upper reactive mesogen layer.

7 Claims, 15 Drawing Sheets

(56) References Cited

U.S. PATENT DOCUMENTS

| | | | |
|---|---|---|---|
| 2011/0138413 A1* | 6/2011 | Hjelm et al. | 725/34 |
| 2011/0221987 A1* | 9/2011 | Kim et al. | 349/39 |
| 2013/0003001 A1* | 1/2013 | Inoue et al. | 349/123 |

* cited by examiner

LIQUID CRYSTAL DISPLAY DEVICE AND METHOD OF MANUFACTURING THE SAME

This application claims priority to Korean Patent Application No. 2008-106521 filed on Oct. 29, 2008, and all the benefits accruing therefrom under 35 U.S.C. §119, the contents of which are herein incorporated by reference in their entirety.

BACKGROUND OF THE INVENTION

1. Field of the Invention

Exemplary embodiments of the present invention relate to a liquid crystal display ("LCD") device and a method of manufacturing the LCD device. More particularly, exemplary embodiments of the present invention relate to an LCD device capable of enhancing display quality such as a viewing angle and a response speed, and a method of manufacturing the LCD device.

2. Description of the Related Art

In a liquid crystal display ("LCD") device, a voltage is applied to an electric field generating electrode to provide the liquid crystal layer with an electric field, and an arrangement of liquid crystal molecules of the liquid crystal layer is controlled in response to the electric filed, thereby displaying images.

In order to obtain a high contrast ratio and a wide viewing angle, a patterned vertical alignment ("PVA") mode LCD device has been developed. In the PVA mode LCD device, an opening portion (hereinafter, a slit portion) of a slit shape is formed through the electric field generating electrode, and liquid crystals are vertically aligned to realize multiple domains.

For a medium or small sized mobile LCD device, in order to decrease the slit portion which decreases an aperture ratio, a micro slit mode LCD device or a super patterned vertical alignment ("SPVA") mode LCD device has been developed. In the micro slit mode LCD device, a micro slit portion is only formed through a lower electrode of the electric field generating electrodes to provide a direction property to the liquid crystal, and an upper electrode is formed as a flat continuous plate in which an opening portion is not formed.

In a vertical alignment ("VA") mode, such as the PVA mode and the micro slit mode, a rubbing is not directly performed on an alignment layer, however, a light alignment method may be employed which aligns liquid crystal by inducing anisotropy to an alignment layer through light irradiating.

Polarized UV lights are irradiated to a light bridge high-molecular copolymer including a mesogenic group of a liquid crystal property, also called a reactive mesogen, to induce anisotropy, and then anisotropy of the alignment layer is enhanced to align liquid crystal by heat processing on the light bridge high-molecular copolymer.

BRIEF SUMMARY OF THE INVENTION

Since a reactive mesogen may be employed to induce anisotropy to an alignment layer through light irradiating, there may be technical difficulties in manufacturing an LCD device when the reactive mesogen is used. For example, the reactive mesogen is not cured at a surface of the alignment layer, and the reactive mesogen remains within an inner area of the liquid crystal layer. The remaining reactive mesogen may be additionally cured by a backlight of the LCD device, however, the cured amounts of the reactive mesogen in accordance with varying areas are different from each other so that a pretilt angle of liquid crystal may be non-uniform between the varying areas. As a result, an afterimage may be undesirably viewed on a display screen.

Exemplary embodiments of the present invention provide an LCD device having improved display quality, such as a viewing angle and a response speed.

Exemplary embodiments of the present invention provide a method of manufacturing the above-mentioned LCD device.

An exemplary embodiment of an LCD device includes an array substrate, an opposite substrate and a liquid crystal layer. The array substrate includes a lower substrate, a pixel electrode and a lower reactive mesogen layer. The lower substrate includes a switching part disposed thereon. The pixel electrode is disposed on a unit pixel area of the lower substrate to contact with the switching part. The pixel electrode includes a plurality of slit portions disposed on a plurality of domains and extended in different directions. The lower reactive mesogen layer is disposed on the pixel electrode to induce a slant direction of liquid crystal molecules. The opposite substrate includes an upper substrate opposite to the lower substrate. A common electrode is disposed on the upper substrate and faces the pixel electrode, and an upper reactive mesogen layer is disposed on the common electrode. The liquid crystal layer includes liquid crystal molecules affected to have a pretilt angle and disposed between a surface of the lower reactive mesogen layer and a surface of the upper reactive mesogen layer.

In an exemplary embodiment of the present invention, the array substrate may further include a lower alignment layer disposed between the pixel electrode and the lower reactive mesogen layer. The opposite substrate may further include an upper alignment layer disposed between the common electrode and the upper reactive mesogen layer. A weight of uncured reactive mesogen material diffused from the lower and upper reactive mesogen layers to the liquid crystal layer, is no more than about 20 weight percent (wt %) with respect to a weight of the lower and upper reactive mesogen layers. The LCD device may further include a diffusion stop layer disposed on surfaces of the lower reactive mesogen layer and the upper reactive mesogen layer to block the reactive mesogen layer from being diffused to the liquid crystal layer.

In an exemplary embodiment of the present invention, the pixel electrode may include a first pixel electrode and a second pixel electrode which are disposed on the unit pixel area and respectively receive different pixel voltages. The slit portions may be disposed on a plurality of domains defined on the first and second pixels, respectively, in the different directions. The common electrode corresponding to the first and second pixel electrodes may have a substantially flat plate shape in which an opening is not disposed. The lower alignment layer and the upper alignment layer may be aligned to be vertically arranged to a long axis of the liquid crystal molecules when an electric field applied to the liquid crystal layer is turned off. Alternatively, the lower alignment layer and the upper alignment layer may be aligned to arrange a long axis of the liquid crystal molecules in an extending direction of the slit portion at each of the domains when an electric field applied to the liquid crystal layer is turned off.

An exemplary embodiment provides a method of manufacturing an LCD device. In the method, a lower alignment layer is disposed on an array substrate including a pixel electrode including a plurality of slit portions inducing an alignment direction of liquid crystal molecules. A lower reactive mesogen layer is disposed on the lower alignment layer. A liquid crystal layer is disposed on the lower reactive mesogen layer. An opposite substrate is coupled with the array substrate. Light is irradiated at a condition in which an electric field is applied to the liquid crystal layer through the pixel electrode to provide a pretilt angle to the liquid crystal molecules at a surface of the lower reactive mesogen layer.

In an exemplary embodiment of the present invention, in the method, an upper alignment layer may be disposed on a common electrode of the opposite substrate before the coupling with the array substrate, and an upper reactive mesogen layer may be disposed on the upper alignment layer. The common electrode corresponding to the pixel electrode may have a substantially flat plate shape in which an opening is not disposed.

In an exemplary embodiment of the present invention, the lower reactive mesogen layer and the upper reactive mesogen layer may be formed by coating a reactive mesogen blend, including a reactive mesogen, on the lower alignment layer and the upper alignment layer, respectively, through a spray method or a coating method. A weight of uncured reactive mesogen material, which is diffused from the lower and upper reactive mesogen layers to the liquid crystal layer, may be no more than about 20 weight percent (wt %) with respect to an initial weight of the lower and upper reactive mesogen layer. Alternatively, a weight of uncured reactive mesogen material, which is diffused from the lower and upper reactive mesogen layers to the liquid crystal layer, may be no more than about 1.0 weight percent (wt %) with respect to an initial weight of the lower and upper reactive mesogen layer. A diffusion stop layer may be further formed, which reduced or effectively prevents the reactive mesogen layer from being diffused to the liquid crystal layer, on surfaces of the lower reactive mesogen layer and the upper reactive mesogen layer. The diffusion stop layer may be formed through a heat processing or a light reactive processing of surfaces of the lower reactive mesogen layer and the upper reactive mesogen layer before the liquid crystal layer is disposed.

In an exemplary embodiment of the present invention, the lower alignment layer and upper alignment layer may be formed by coating a blend including at least one of photoreactive polymer of a cinematic series and a polymer of a polyimide series on the pixel electrode and the common electrode. The pixel electrodes may be disposed on a unit pixel area of the array substrate, and the slit portions may be disposed in the different directions on a plurality of domains defined on each of the pixel electrodes. The lower alignment and the upper alignment layer may be aligned so that a long axis of the liquid crystal molecules is vertically aligned. Alternatively, the lower alignment layer and the upper alignment layer may be aligned so that the long axis of the liquid crystal molecules is arranged in an extending direction of the slit portion at each of the domains.

In exemplary embodiments of the LCD device and the method of manufacturing the LCD device, an aperture ratio and a response speed are enhanced, and a generation of an undesired afterimage is decreased, so that display quality may be advantageously enhanced.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
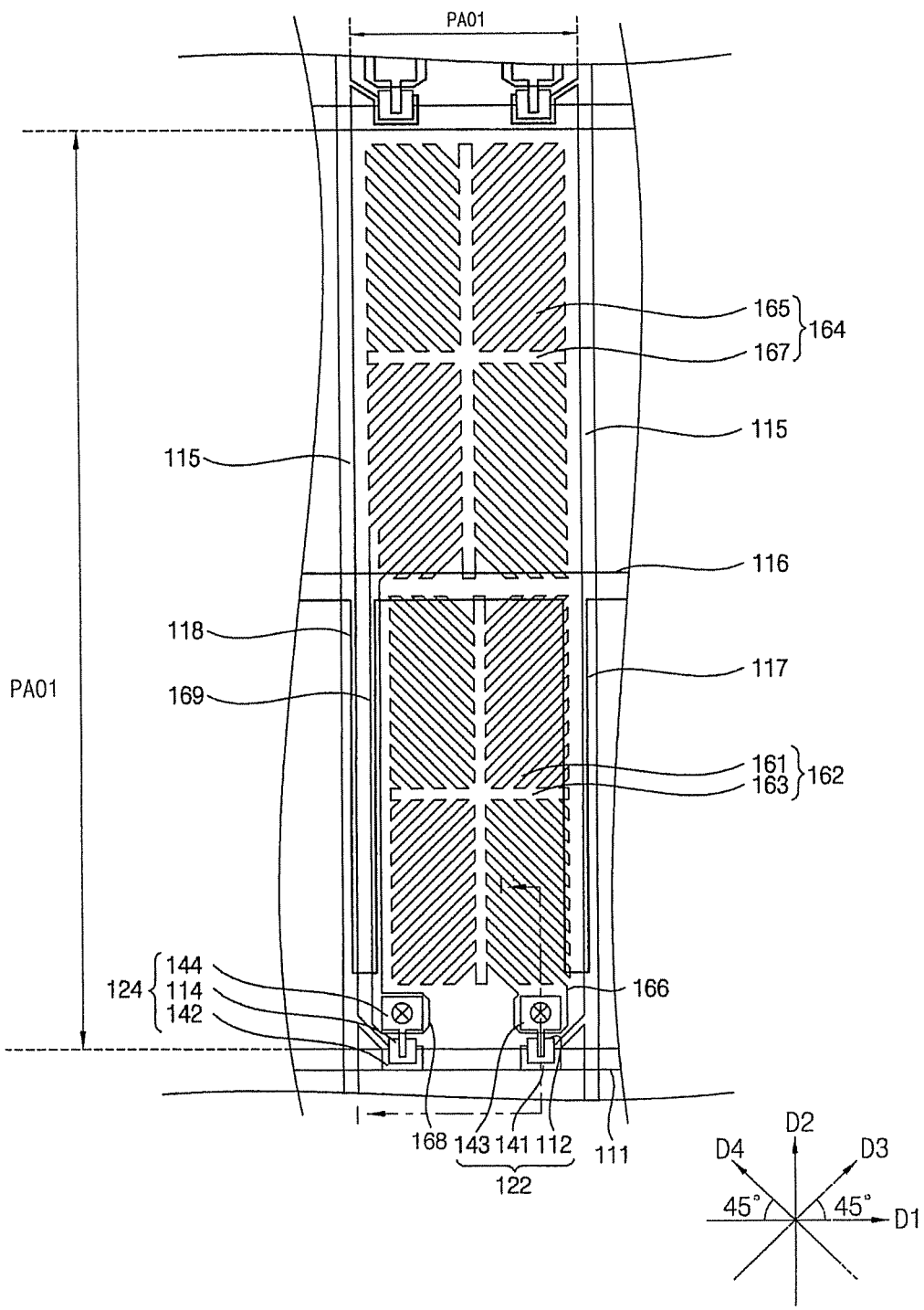
FIG. 1 is a plan view illustrating an exemplary embodiment of an array substrate employed in a liquid crystal display (LCD) device.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Hereinafter, the present invention will be explained in detail with reference to the accompanying drawings.

Figure 2:
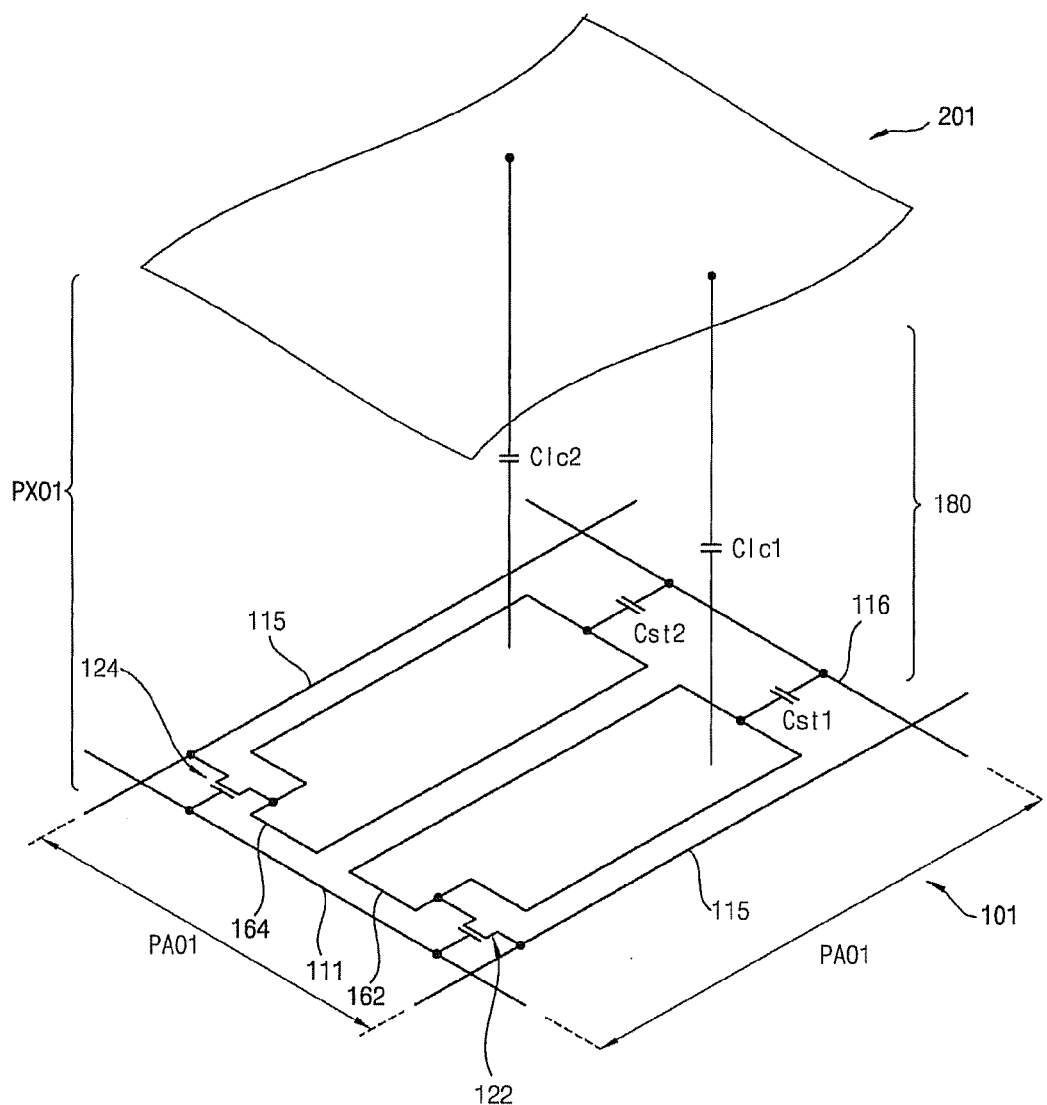
FIG. 2 is an equivalent circuit diagram illustrating an exemplary embodiment of one pixel in the LCD including the array substrate illustrated in FIG. 1.

FIG. 1 is a plan view illustrating an exemplary embodiment of an array substrate 101 employed in a liquid crystal display ("LCD") device. FIG. 2 is an equivalent circuit diagram illustrating an exemplary embodiment of one pixel PX01 in the LCD including the array substrate 101 illustrated in FIG. 1.

Referring to FIGS. 1 and 2, an LCD device includes the array substrate 101, an opposite substrate 201 and a liquid crystal layer 180 interposed between the array substrate 101 and the opposite substrate 201. Various technologies for enhancing display quality may be employed to the LCD device.

In one exemplary embodiment, a plurality of a pixel electrode, indicated by 162 and 164 in FIGS. 1 and 2, is disposed on a single unit pixel area PA01 of the LCD device, and receives pixel voltages that are different from each other. A plurality of a micro slit portion, indicated by 161 and 165 in FIG. 2, is disposed to extend completely through the pixel electrodes 162 and 164, respectively, in order to enhance a viewing angle by varying alignment directions of liquid crystal molecules. A reactive mesogen layer is disposed on the pixel electrodes 162 and 164, and a common electrode of the opposite substrate 201, respectively, in order to enhance a response speed of the liquid crystal. The liquid crystal is aligned to have a pretilt angle directly by the reactive mesogen layer. The LCD device for enhancing display quality, and a method of manufacturing the LCD will be described.

In the illustrated embodiment, the array substrate 101 includes, as shown in FIGS. 1 and 2, a plurality of a gate line 111, a plurality of a data line 115, a plurality of a storage line 116, the plurality of pixel electrodes 162 and 164, and a switching part. In the illustrated embodiment, two pixel electrodes 162 and 164 are disposed on the unit pixel area PA01. A first pixel electrode to which a relatively high level pixel voltage is applied may be denoted as a main pixel electrode, and a second pixel electrode to which a relatively low level pixel voltage is applied may be denoted as a sub-pixel electrode. In the illustrated embodiment of FIGS. 1 and 2, the main pixel electrode is defined as the first pixel electrode 162, and the sub-pixel electrode is defined as the second pixel electrode 164.

The first and second pixel electrodes 162 and 164 are each electrically connected to a same gate line 111, and are each electrically connected to different data lines 115. Referring to FIGS. 1 and 2, a pixel of the LCD device is driven in one gate line and two data line (1G2D) method. In the illustrated embodiment, the switching part includes a first switching element 122 and a second switching element 124. The first switching element 122 electrically connects the first pixel electrode 162 to a first gate line 111 and a first data line 115. The second switching element 124 electrically connects the second pixel electrode 164 to the first gate line 111 and a second data line 115 different from the first data line 115, such as an adjacent data line 115.

The storage line 116 includes a first (main) portion longitudinally extended in the row direction D1, and substantially parallel with the gate lines 111. A plurality of a branch portion is protruded from the first portion and extended in the column direction D2 towards the first switching element 122 and the second switching element 124 in a plan view. A first branch portion 117 and a second branch portion 118 are substantially disposed within the unit pixel area PA01, where a portion of each of the first branch portion 117 and the second branch portion 118 overlaps with adjacent data lines 115 and the first pixel electrode 162. A portion of the first (main) portion of the storage line 116 overlaps boundaries of both the first pixel electrode 162 and the second pixel electrode 164.

The opposite substrate 201 includes a common electrode disposed to face the first and second pixel electrodes 162 and 164. The first pixel electrode 162, the common electrode and the liquid crystal layer 180 form a first liquid crystal capacitor Clc1, and the second pixel electrode 164, the common electrode and the liquid crystal layer 180 form a second liquid crystal capacitor Clc2. The first pixel electrode 162 and a first storage line 116 together form a first storage capacitor Cst1, and the second pixel electrode 164 and the first storage line 116 together form a second storage capacitor Cst2.

Pixel voltages of the different levels may be applied to the first and second pixel electrodes 162 and 164, respectively. In one exemplary embodiment, a first pixel voltage applied to the first pixel electrode 162 is higher than a second pixel voltage applied to the second pixel electrode 164. Alternatively, a first pixel voltage applied to the first pixel electrode 162 is lower than a second pixel voltage applied to the second pixel electrode 164. When levels of the first and second pixel voltages are adjusted, images viewed at a side (e.g., not in a front) of a display screen of the LCD device may have substantially close to or the same display characteristics of an image viewed at substantially a front of the display screen of the LCD device. Advantageously, display quality is substantially uniform in accordance with the viewing angle, so that side visibility of the LCD device may be enhanced.

Figure 3:
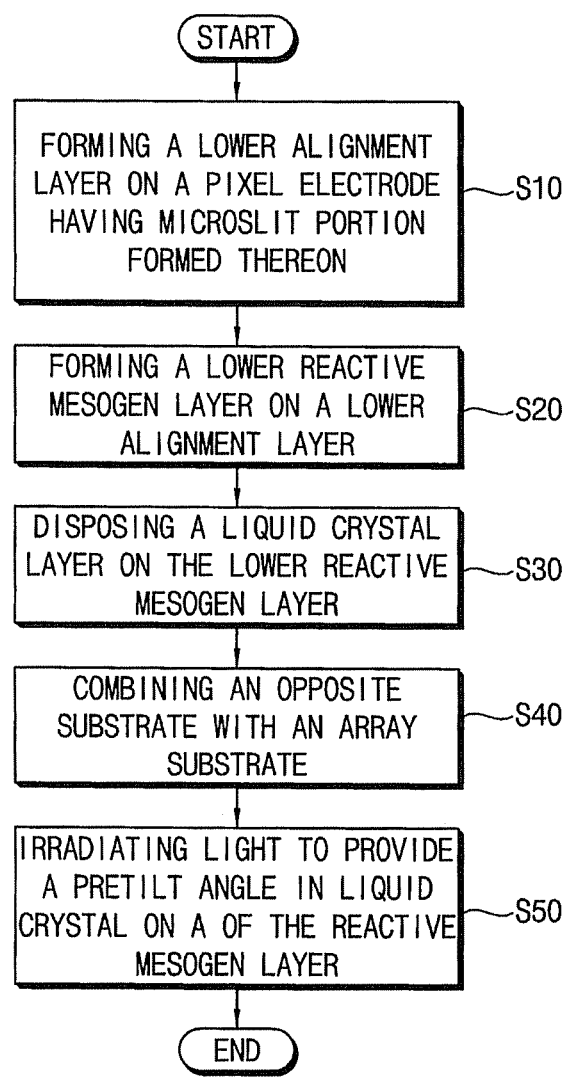
FIG. 3 is a flowchart illustrating an exemplary embodiment of a method of manufacturing an LCD device.

FIG. 3 is a flowchart illustrating an exemplary embodiment of a method of manufacturing an LCD device.

Summarizing a method of manufacturing the LCD device of the illustrated embodiment, a lower alignment layer is formed on the array substrate 101 including a pixel electrode including micro slit portions 161 and 165 formed therethrough which determine an alignment direction of liquid crystal (step S10). A lower reactive mesogen layer is formed on the lower alignment layer (step S20). The liquid crystal layer 180 is disposed on the lower reactive mesogen ("RM") layer (step S30). The opposite substrate 201 is combined with the array substrate 101 (step S40). In a status in which an electric field is applied to the liquid crystal layer 180 through the first and second pixel electrodes 162 and 164, light is irradiated to the opposite substrate 201 to provide a pretilt angle to liquid crystal (step S50).

Hereinafter, each manufacturing processes will be detail described.

Figure 4:
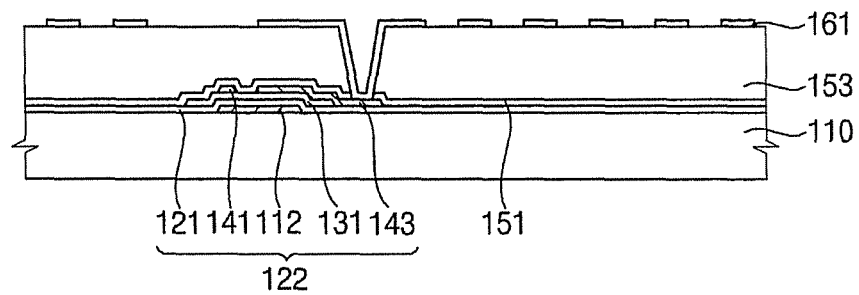
FIG. 4 is a cross-sectional view taken along line I-I' of the array substrate of FIG. 1.
Figure 5:
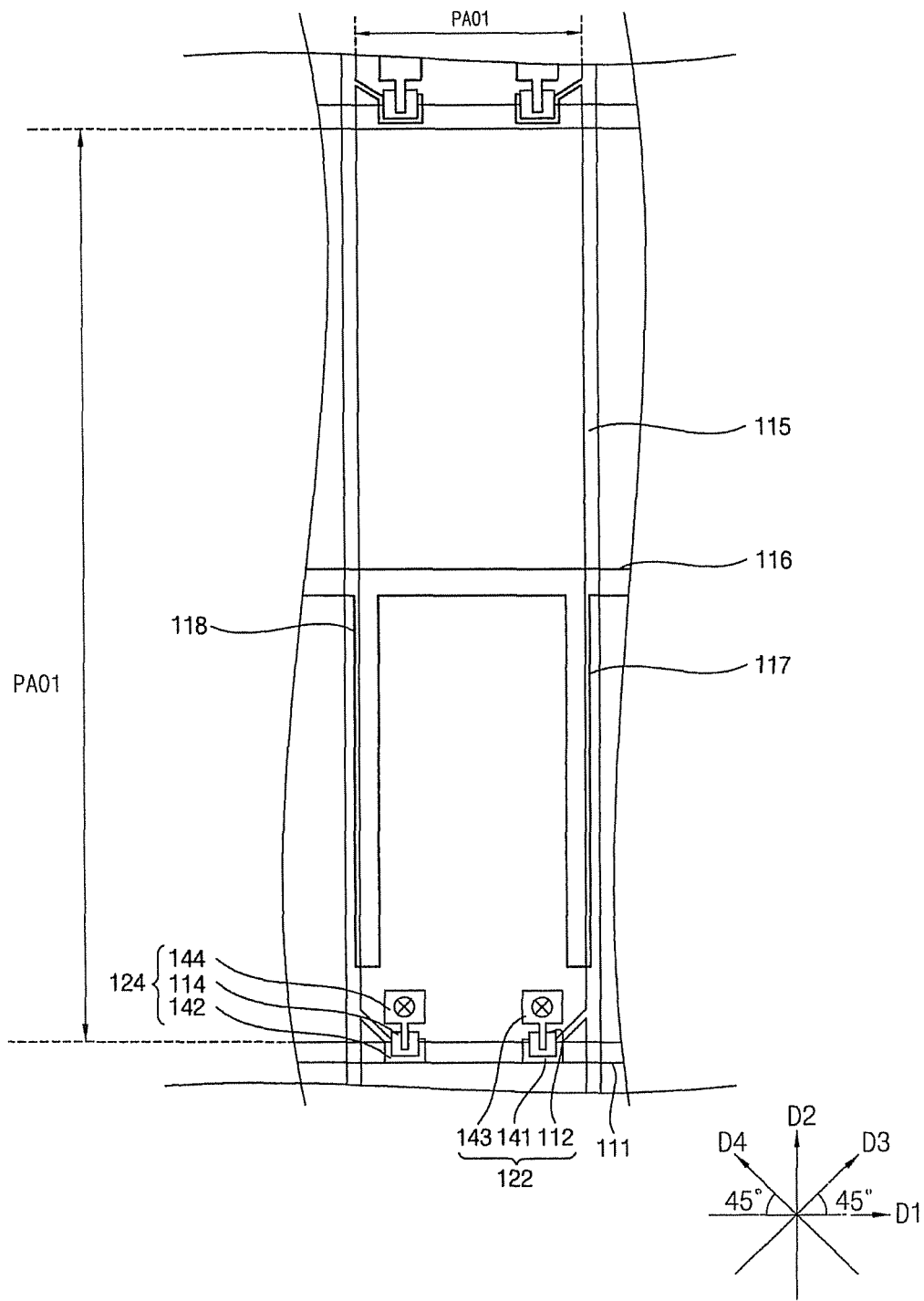
FIG. 5 is a plan view illustrating an exemplary embodiment of the array substrate excluding a pixel electrode of FIG. 1.
Figure 6:
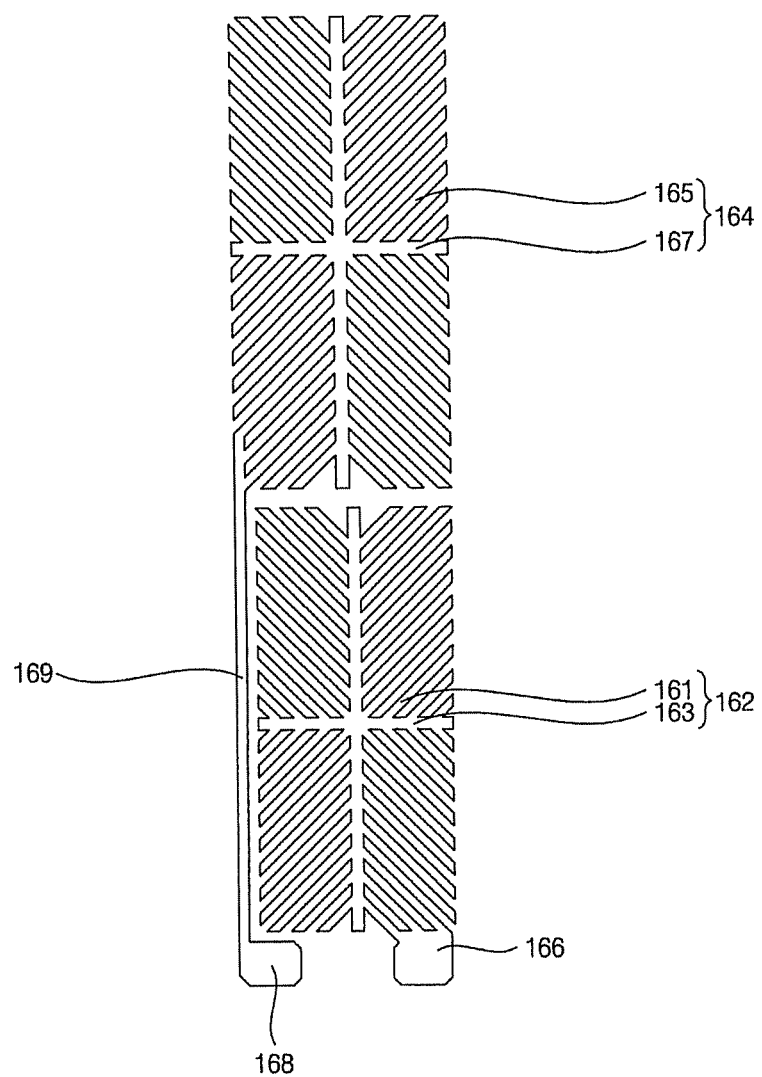
FIG. 6 is a plan view illustrating an exemplary embodiment of a pixel electrode of the array substrate as illustrated in FIG. 1.

FIG. 4 is a cross-sectional view taken along line I-I' of an array substrate 101 of FIG. 1. FIG. 5 is a plan view illustrating an exemplary embodiment of an array substrate 101 excluding a pixel electrode of FIG. 1. FIG. 6 is a plan view illustrating an exemplary embodiment of a pixel electrode of an array substrate 101 as illustrated in FIG. 1.

Referring to FIGS. 4, 5 and 6, a lower alignment layer is formed on the array substrate 101 which includes the first and second pixel electrodes 162 and 164 including the micro slit portions 161 and 165, which determine an alignment direction of liquid crystal, formed thereon (step S10).

The array substrate 101 includes a plurality of a gate line 111, a plurality of a data line 115, first and second switching elements 122 and 124 and first and second pixel electrodes 162 and 164 which are disposed on a lower base substrate 110. In an exemplary embodiment, the lower base substrate 110 may include a glass material, but the invention is not limited thereto.

A gate metal is coated on the lower base substrate 110 The coated gate metal is etched to form the gate lines 111. The gate lines 111 are disposed on the lower base substrate 110 in parallel with a row direction D1 indicated in FIGS. 1 and 5. A portion of each of the gate lines 111 forms a gate electrode 112 of a protruding shape. As shown in FIG. 4, a gate insulation layer 121 is disposed on the gate lines 111, and directly contacts both the gate lines 111 and the lower base substrate 110.

A semiconductor layer and a source metal layer are sequentially formed on the gate insulation layer 121. The source metal layer and the semiconductor layer are etched to form a plurality of a data line 115, a source electrode 141, a channel layer 131 and a drain electrode 143 as shown in FIGS. 4 and 5. The data lines 115 are extended in a substantially column direction D2 indicated in FIG. 5, and disposed on the gate insulation layer 121. The source electrode 141 is extended from the data line 115 at a crossing area of the gate line 111 and the data line 115, and overlaps with a portion of the gate electrode 112 as shown in FIGS. 4 and 5. A first portion of the drain electrode 143 is disposed on and overlapping the gate electrode 112 at an area overlapping with the source electrode 141, and a second portion of the drain electrode 143 is extended toward and completely overlapped by the unit pixel area PA01.

Referring to FIGS. 1 and 5, a pair of adjacent gate lines 111 and a pair of adjacent data lines 115 intersect each other to define a substantially rectangular area therebetween, and the first and second pixel electrodes 162 and 164 are disposed on the rectangular shaped area. An entire of both of the first and second electrodes 162 and 164 may be disposed between the pair of adjacent gate lines 111 and the pair of adjacent data lines 115. In the illustrated exemplary embodiment, the rectangular area will be defined as the unit pixel area PA01, but the invention is not limited thereto. Alternatively, a shape of the unit pixel area PA01 may be a different shape, such as Z-shape, and/or may not be defined by gate lines 111 and data lines 115.

Referring again to FIGS. 4 and 5, the gate electrode 112, the gate insulation layer 121, the channel layer 131, the source electrode 141 and the drain electrode 143 define the first switching elements 122, and form a three terminal element. The second switching element 124 may include a gate electrode 114, the gate insulation layer 121, the channel layer 131, a source electrode 142 and a drain electrode 144.

As shown in FIG. 4, the passivation layer 151 covering (e.g., overlapping) the data line 115 is disposed on the lower base substrate 110, and an organic insulation layer 153 is disposed on the passivation layer 151. A contact hole exposing a portion of the drain electrode 143 is extended through both the organic insulation layer 153 and the passivation layer 151.

An optically transparent and electrically conductive material layer, such as indium tin oxide ("ITO"), indium zinc oxide ("IZO"), amorphous indium tin oxide ("a-ITO"), etc., is disposed on the organic insulation layer 153, such as by a coating method. The optically transparent and electrically conductive material layer contacts with the drain electrode 143 through the contact hole. The optically transparent and electrically conductive material layer disposed on the organic insulation layer 153 is etched to form the first and second pixel electrodes 162 and 164 as shown in FIGS. 4 and 6. In the illustrated embodiment, in order to enhance a viewing angle, a viewing enhancing technology may be employed in the forming of the first and second pixel electrodes 162 and 164. In one exemplary, a technology in which an alignment direction of liquid crystal is divided into a plurality of domains that are different from each other may be employed to the unit pixel area PA01.

Referring to the illustrated exemplary embodiment in FIGS. 1 and 6, in order to obtain the domains, the first and second pixel electrodes 162 and 164 may include a plurality of supporting electrodes 163 and 167, and a plurality of micro slit portions 161 and 165, respectively. The supporting electrodes 163 and 167 may have substantially a bar shape. The supporting electrodes 163 and 167 may be disposed in a crossed shape defined by the row direction D1 and the column direction D2, for each of the first and second pixel electrodes 162 and 164, respectively.

Each of the supporting electrodes 163 and 167 may include a first portion longitudinally extending in the row direction D1, and a second portion longitudinally extending tin the column direction D2. The first and second portions of each of the first and second pixel electrodes 162 and 164 may intersect each other at substantially a 90 degree angle, but the invention is not limited thereto.

Each of the micro slit portions 161 and 165 may be respectively extended along a first oblique line direction D3 (FIGS. 1 and 5) and a second oblique line direction D4 (FIGS. 1 and 5), which each cross the row direction D3 and the column direction D2 with an angle of about 45 degrees, respectively. Each of the micro slit portions 161 and 165 may be formed to extend in different directions by domains be employed to the unit pixel area PA01.

Each of the micro slit portion 161 and 165 longitudinally extend obliquely with respect to the first and second portions of the supporting electrodes 163 and 167. In the plan view of FIG. 6, boundaries or edges of the first and second pixel electrodes 162 and 164 defined by distal ends of the supporting electrodes 163 and 167 and the micro slit portion 161 and 165 define a substantially rectilinear shape.

Referring to FIGS. 1, 4, 5 and 6, the first pixel electrode 162 may include a first connecting electrode portion 166 protruded from a group of micro slit portions 161 and overlapping the contact hole extended through both the organic insulation layer 153 and the passivation layer 151 which exposes the portion of the drain electrode 143 of the first switching element 122. The first connecting electrode portion 166 has a plan view dimension that is larger than both the micro slit portion 161 and the supporting electrode 163 portions. The first connecting electrode portion 166, the micro slit portion 161 and the supporting electrode 163 portions are electrically connected to each other and disposed as a single, continuous and indivisible member in the unit pixel area PA01.

Referring to FIGS. 1, 4, 5 and 6, the second pixel electrode 164 may include a second connecting electrode portion 169 protruded from a group of micro slit portions 165. A first end of the second connecting electrode portion 169 is continuously disposed with distal ends of the group of micro slit portions 165 from which it extends. The second connecting electrode portion 169 is longitudinally extended from the group of micro slit portions 165 in the column direction D2, and substantially parallel with the data lines 115. The second connecting electrode portion 169 is disposed between a data line 115 and an adjacent border of the first pixel electrode 162, as illustrated in the plan view of FIGS. 1 and 6.

Referring to FIGS. 1, 4, 5 and 6, the second pixel electrode 164 may further include a third connecting electrode portion 168 protruded from a second (e.g., distal) end of the second connecting electrode portion 169, and overlapping a contact hole extended through both the organic insulation layer 153 and the passivation layer 151 which exposes the portion of the drain electrode 144 of the second switching element 124. The second connecting electrode portion 169, the third connecting electrode portion 168, the micro slit portion 165 and the supporting electrode 167 portions are electrically connected to each other and disposed as a single, continuous and indivisible member in the unit pixel area PA01.

A long axis of the liquid crystal may be arranged substantially in parallel with an extended direction of the micro slit portions 161 and 165. As a result, a plurality of domains is formed to enhance a viewing angle of the LCD device. A lower polarizing plate (not shown) may be attached at a rear surface (e.g., a lowermost surface in FIG. 4) of the lower base substrate 110.

In one exemplary embodiment, the micro slit portions 161 and 165 disposed through the first and second pixel electrodes 162 and 164 may be obliquely extended in a direction forming at an angle of about 45 degrees or about 135 degrees with respect to a lower polarizing axis of the lower polarizing plate, such as the first oblique line direction D3 and the second oblique line direction D4.

Figure 7:
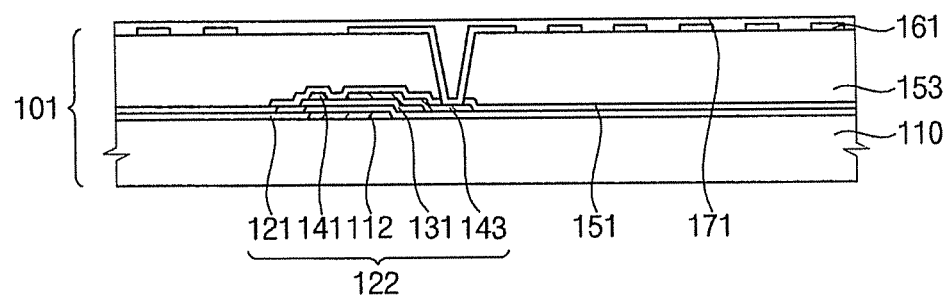
FIG. 7 is a cross-sectional view illustrating an exemplary embodiment of a process for manufacturing a lower alignment layer on an array substrate of FIG. 4.

FIG. 7 is a cross-sectional view illustrating an exemplary embodiment of a process for manufacturing a lower alignment layer 171 on an array substrate 101 of FIG. 4.

Referring to FIG. 7, the lower alignment layer 171 covering the first and second pixel electrodes 162 and 164 is formed (step S10). The lower alignment layer 171 is disposed overlapping and directly contacting each of the first and second pixel electrodes 162 and 164, and the organic insulating layer 153.

In an exemplary embodiment, the lower alignment layer 171 may be formed by coating a photo-reactive polymer of a cinematic series, and a polymer blend of a polyimide series on the first and second pixel electrodes 162 and 164 and curing the coated photo-reactive polymer and the polymer blend. In one exemplary embodiment, the photo-reactive polymer of a cinematic series and the polymer blend of a polyimide series are blended in a ratio of about 1:9 (weight percent) to 9:1 (weight percent) to melt in an organic solvent, and then the polymer melted in the organic solvent is coated on the substrate, such as in a spin coating method. The coated polymer is cured, such as by heating, so that the lower alignment layer 171 may be formed.

An ultraviolet ("UV") light is irradiated on the lower alignment 171 to generate an alignment force characteristic for a liquid crystal layer 180. By using the light alignment process, the lower alignment layer 171 may align liquid crystal of the liquid crystal layer 180 substantially in a vertical direction, that is, a direction from the array substrate 101 to the opposite substrate 201 which is substantially perpendicular to both the array substrate 101 to the opposite substrate 201.

Figure 8:
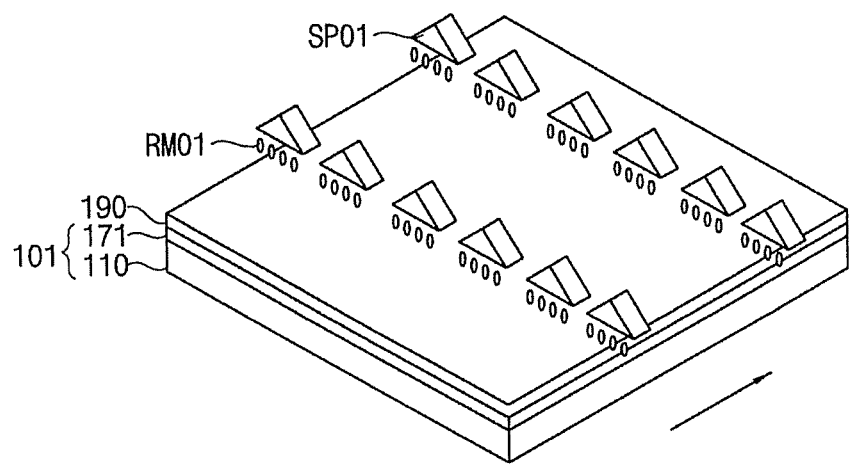
FIG. 8 is a process diagram illustrating an exemplary embodiment of a process for manufacturing a lower reactive mesogen ("RM") layer on the lower alignment layer through a spray method.
Figure 9:
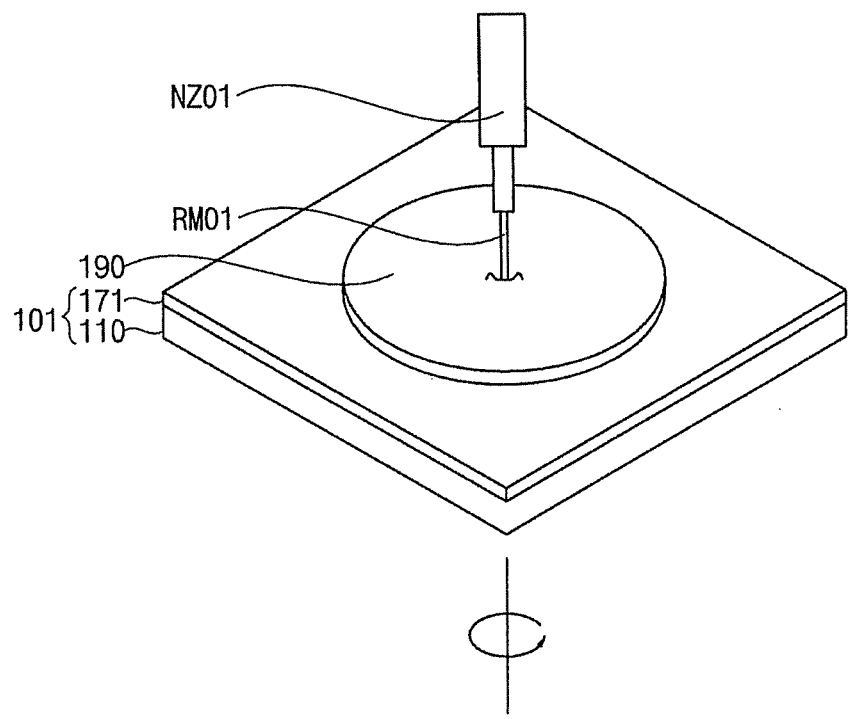
FIG. 9 is a process diagram illustrating an exemplary embodiment of a process for manufacturing a lower RM layer on the lower alignment layer through a coating method.
Figure 10:
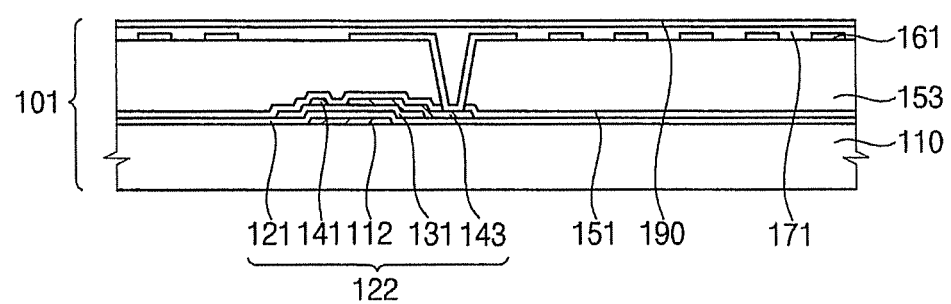
FIG. 10 is a cross-sectional view illustrating an exemplary embodiment of a process for manufacturing a lower RM layer on a lower alignment layer.

FIG. 8 is a process diagram illustrating an exemplary embodiment of a process for manufacturing a lower RM layer 190 on the lower alignment layer 171 through a spray method. FIG. 9 is a process diagram illustrating an exemplary embodiment of a process for manufacturing a lower RM layer 190 on the lower alignment layer 171 through a coating method. FIG. 10 is a cross-sectional view illustrating another exemplary embodiment of a process for manufacturing a lower RM layer 190 on a lower alignment layer 171.

Referring to FIG. 3, the lower RM layer 190 is formed on the lower alignment layer 171 (step S20). The lower RM layer 190 may be used to enhance a response speed of the LCD device by allowing a pretilt angle to the liquid crystal layer 180. A term of the "mesogen" is used to define a light bridge high-molecular copolymer polymer including a mesogen group of a liquid crystal property. When a polarized UV light is irradiated to the mesogen, anisotropy of the mesogen is induced, and then a heat process is performed to enhance a direction property of liquid crystal.

In the illustrated embodiment, the mesogen group is a polymer material which has a liquid crystal property at a predetermined temperature range or a liquid solution state. The reactive mesogen RM may include a material or compound including one or more rod-shaped, banana-shaped, board-shaped or disk-shaped mesogenic groups, i.e. groups capable of showing liquid crystal phase behavior. The RM may include mesogen having acrylate, metacrylate, epoxy, oxetanes, vinyl ether, styrene, thiophene, etc.

In one illustrated exemplary embodiment, the mesogen blend RM01 including the RM may be coated on the lower alignment layer 171 through a spray method using a spray nozzle SP01 as shown in FIG. 8. Alternatively, as shown in FIG. 9, the mesogen blend RM01 may be coated on the lower alignment layer 171 through a spin coating method using a coating nozzle NZ01. The mesogen blend RM01 may include a free radical initiator having photosensitivity or heat sensitivity, and/or a polymer initiator such as a cationic agent. The initiator may be operated by light or heat. The mesogen blend RM01 may include a composition such as at least one of polymer initiators.

After the mesogen blend RM01 is applied to the lower alignment layer 171 (FIGS. 8 and 9), a volatile composition is removed from the mesogen blend RM01, and the lower RM layer 190 is formed on the lower alignment layer 171 as shown in FIG. 10. The lower RM layer 190 may be disposed on essentially a whole of the array substrate 101, and overlapping and directly contacting the organic insulating layer 153.

When liquid crystal is arranged on the lower alignment layer 171, the lower RM layer 190 is aligned in an alignment direction of the lower alignment layer 171 to induce the liquid crystal to have a pretilt angle. In order not to cure the lower RM layer 190, an incident light provided from an external side may be blocked to the lower RM layer 190 during the spray process or the spin coating process.

Figure 11:
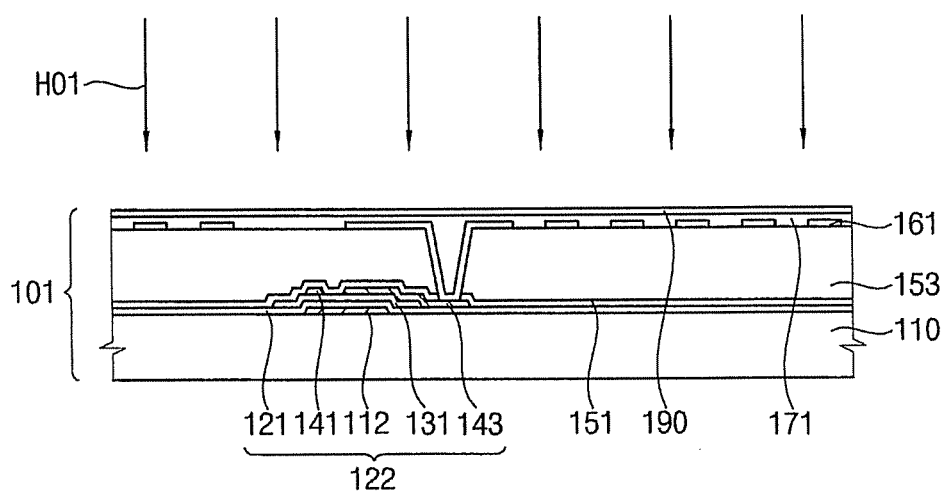
FIG. 11 is a cross-sectional view illustrating an exemplary embodiment of a process for manufacturing a diffusion stop layer on a surface of a lower RM layer.

FIG. 11 is a cross-sectional view illustrating an exemplary embodiment of a process for manufacturing a diffusion stop layer on a surface of a lower RM layer 190.

In the method of manufacturing the LCD device, a liquid crystal layer 180 is disposed on the lower RM layer 190. Since the lower RM layer 190 is not cured when the liquid crystal layer 180 is disposed on the lower RM layer, the RM in the lower RM layer 190 may be distributed to the liquid crystal layer 180. When an amount of RM mixed to the liquid crystal layer 180 is relatively large, a generation of an undesirable afterimage may be increased in an LCD device. Referring to FIG. 11, a diffusion stop layer (not shown) may be formed on the lower RM layer 190, in order to suppress the RM in the lower RM layer 190 from being transferred into the liquid crystal layer 180. In an exemplary embodiment, the diffusion stop layer is a relatively thin film into which characteristics of a surface of the lower RM layer 190 are varied. The diffusion stop layer is disposed between the lower RM layer 190 and the liquid crystal layer 180.

In one exemplary embodiment, a UV light of which strength and time are properly controlled, is irradiated to a surface of the lower RM layer 190 (as indicated by H01 in FIG. 11) to soft light cure the surface of the lower RM layer 190, so that the diffusion stop layer may be formed. Alternatively, an infrared ray of which strength and time are properly controlled is irradiated to a surface of the lower RM layer 190 to soft heat cure the surface of the lower RM layer 190, so that the diffusion stop layer may be formed.

In an alternative embodiment, when adhesive characteristics between the lower RM layer 190 and the lower alignment layer 171, and chemical composition of the RM are properly controlled and selected, the amount of the RM disposed in the liquid crystal layer 180 may be decreased even though the diffusion strop layer is not formed. Therefore, a formation process of the diffusion stop layer may be omitted.

Figure 12:
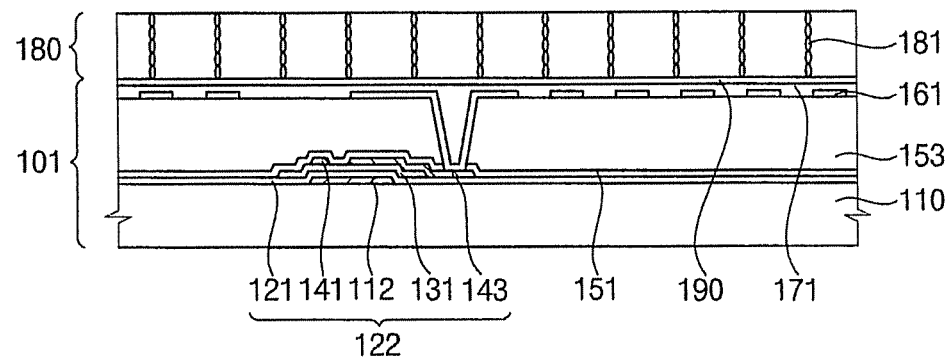
FIG. 12 is a cross-sectional view illustrating an exemplary embodiment of a process for disposing a liquid crystal layer on a lower RM layer.

FIG. 12 is a cross-sectional view illustrating an exemplary embodiment of a process for disposing a liquid crystal layer 180 on a lower RM layer 190.

A liquid crystal layer 180 is disposed on the lower RM layer 190 as shown in FIG. 12, after the formation process of the diffusion stop layer or after the formation process of the lower RM layer 190 (step S30). Liquid crystals 181 are disposed on the lower RM layer 190, such as through a direct drop method, so that the liquid crystal layer 180 may be disposed on the lower RM layer 190.

Figure 13:
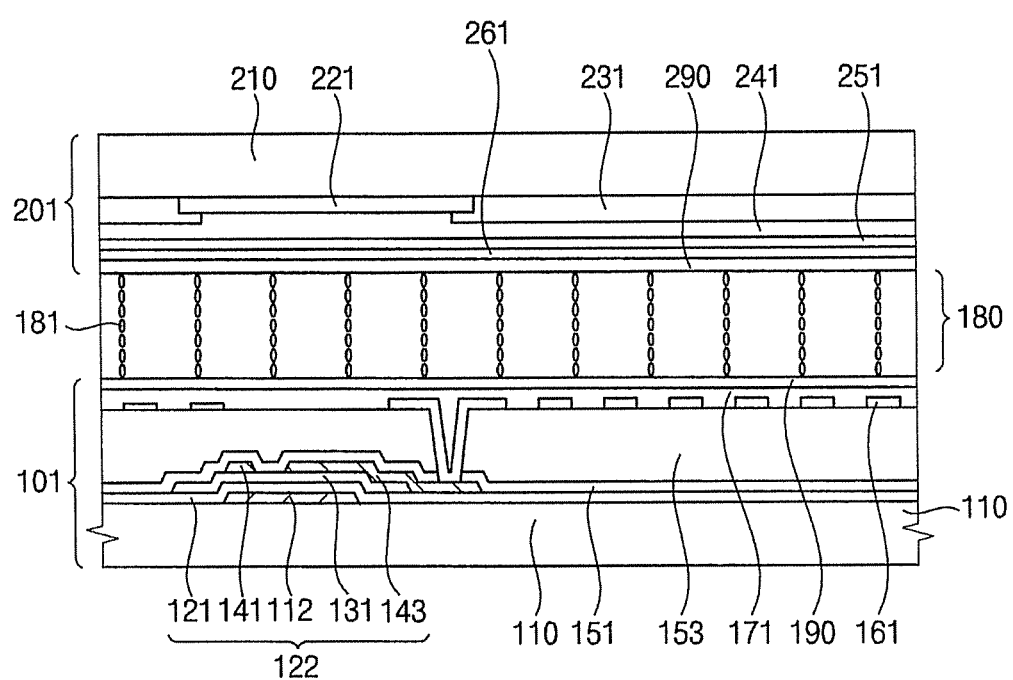
FIG. 13 is a cross-sectional view illustrating an exemplary embodiment of a process for combining an array substrate including a liquid crystal layer disposed thereon and an opposite substrate.

FIG. 13 is a cross-sectional view illustrating an exemplary embodiment of a process for combining an array substrate 101 including a liquid crystal layer 180 disposed thereon, and an opposite substrate 201.

As shown in FIG. 13, the opposite substrate 201 is combined with the array substrate 101 (step S40).

The opposite substrate 201 may include an upper base substrate 210, a light-blocking pattern 221, a color filter pattern 231, an overcoating layer 241, a common electrode 251 and an upper alignment layer 261.

The light-blocking pattern 221 is disposed on the upper base substrate 210 in correspondence with (e.g., overlapped with portions of) the gate line 111, the data line 115, the first and second switching elements 122 and 124 and the storage line 116. The light-blocking pattern 221 may a not be disposed overlapping the unit pixel area PA01. The color filter pattern 231 is disposed on the unit pixel area PA01 which is not blocked by light. In an exemplary embodiment, the color filter pattern 231 may include, but is not limited to, a red color filter, a green color filter and a blue color filter. The red, green and blue color filters may be sequentially disposed in correspondence with each unit pixel area PA01 in a column direction D1.

The overcoating layer 241 overlaps the color filter pattern 231 and the light-blocking pattern 221, such being disposed on an entire of the upper base substrate 210. The common electrode 251 is disposed on the overcoating layer 241 and opposite to the upper base substrate 210 with respect to the overcoating layer 241. In the illustrated embodiment, a material of the common electrode 251 is same as that of the first and second pixel electrodes 162 and 164.

Where the common electrode 251 is disposed corresponding substantially to the unit pixel area PA01, the common electrode 251 may be formed in a substantially flat plate shape in which slit portions, that is, an opening is not formed. The common electrode 251 may be disposed as a single, continuous and indivisible member as including no openings. In the illustrated embodiment, when micro slit portions 161 and 165 are formed in the first and second pixel electrodes 162 and 164, respectively, and the common electrode 251 is formed in a substantially continuous flat plate shape in which slit portions are not formed, a liquid crystal cell type is called as a super-vertical alignment ("S-VA") mode. Alternatively, the liquid crystal layer 180 may be driven in a pattern vertical alignment ("PVA") mode. In the PVA mode, a plurality of slit portions for forming a fringe field on each of the first pixel electrode 162, the second pixel electrode 164 and the common electrode 251 may be disposed.

Referring again to FIG. 13, the upper alignment layer 261 is disposed on the common electrode 251. In an exemplary embodiment, a material of the upper alignment layer 261 is same as that of the lower alignment layer 171.

An upper RM layer 290 may be disposed on the upper alignment layer 261 by using the same method if forming the lower RM layer 190, that is, the spray method or the coating method as described above.

In an exemplary embodiment, an upper polarizing plate (not shown) may be disposed on an outer surface of the opposite substrate 201, such as to form an outermost layer of the LCD device. A polarizing axis of the upper polarizing plate may be substantially perpendicular to that of the lower polarizing plate.

Prior to applying an electric field between the first and second pixel electrodes 162 and 164 of the array substrate 101, and the common electrode 251 of the opposite substrate 201, a long axis direction of liquid crystal 181 (hereinafter, referred to as a director of liquid crystal) may be aligned in a direction substantially perpendicular to the array substrate 101 and the opposite substrate 201 as shown in FIG. 13.

Figure 14:
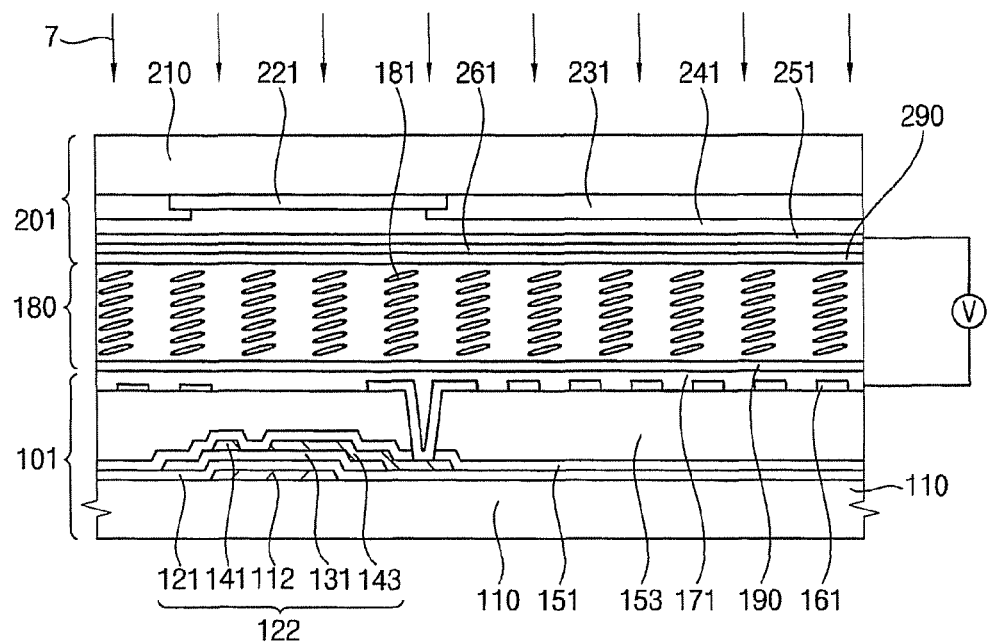
FIGS. 14 and 15 are cross-sectional views illustrating an exemplary embodiment of a process for allowing a pretilt angle of liquid crystal molecules.
Figure 15:
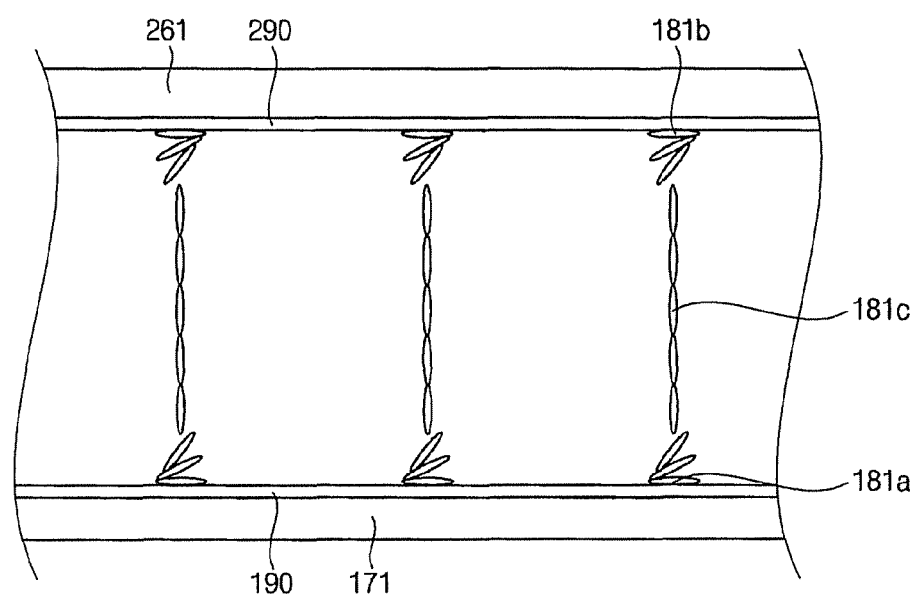

FIGS. 14 and 15 are cross-sectional views illustrating an exemplary embodiment of a process for allowing a pretilt angle of liquid crystal molecules 181.

Referring to FIGS. 14 and 15, light 7 is irradiated to the liquid crystal layer 180 through the opposite substrate 201 to affect a pretilt angle to the liquid crystal 181 at a surface of the lower RM layer 190 and a surface of the upper RM layer 290 (step S50).

When the pixel voltage is applied to the first and second pixel electrodes 162 and 164, and when the common voltage is applied to the common electrode 251, the director of the liquid crystal 181 is aligned in substantially a horizontal direction as shown in FIG. 14. Thus, a white driving mode may be realized. In exemplary embodiments, in order to fully align the director of the liquid crystal 181, the pixel voltage and the common voltage may be increased.

In the white driving mode, as shown in FIG. 14, an ultraviolet light 7 is irradiated on the opposite substrate 201. The lower RM layer 190 and the upper RM layer 290 are cured at surfaces of the lower RM layer 190 and the upper RM layer 290 adjacent to the lower and upper alignment layers 171 and 261, respectively, to determine a direction property of liquid crystal 181 in response to the ultraviolet light.

Referring to FIG. 15, the liquid crystals 181a and 181b directly adjacent to the lower and upper RM layers 190 and 290, respectively, may be substantially fixed in a direction in which the liquid crystals 181a and 181b are arranged in the horizontal direction. When an electric field is not applied to the liquid crystal layer 180, as shown in FIG. 15, liquid crystals are arranged. That is, liquid crystals 181a and 181b horizontally lie down at surfaces of the lower RM layer 190 and the upper RM layer 290 adjacent to the liquid crystal layer 180, or have an inclined angle with respect to surfaces of the lower RM layer 190 and the upper RM layer 290. For the liquid crystals located closer to a middle of liquid crystal layer between the array substrate 101 and the opposite substrate 201, the liquid crystals 181c are gradually arranged substantially perpendicular with respect to surfaces of the lower RM layer 190 and the upper RM layer 290 as a distance increases from the array substrate 101 and the opposite substrate 201.

Due to the arrangement of the liquid crystal 181, a response time of the liquid crystal 181 may be advantageously enhanced. Moreover, arrangement directions of the liquid crystal are various, so that a viewing angle may be advantageously enhanced.

In the illustrated embodiment, the RM of the lower and upper RM layers 190 and 290 are not mixed with the liquid crystal 181 to be cured through a UV light, at a condition in which the RM is coated on surfaces of the lower alignment layer 171 and the upper alignment layer 261. Advantageously, as described above, the RM is not mixed with the liquid crystal layer 180.

Figure 16:
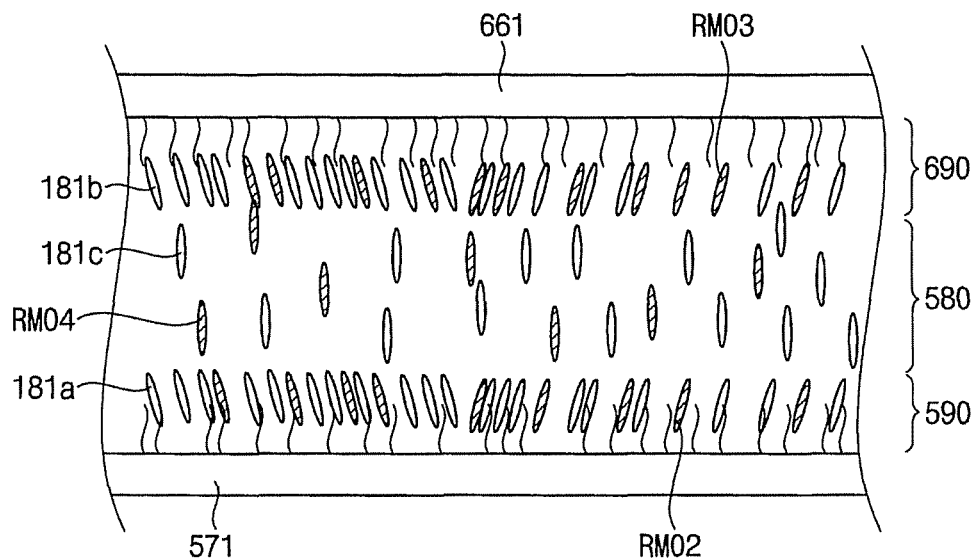
FIG. 16 is a cross-sectional view illustrating an exemplary embodiment of a generation of the remaining RM layer in the LCD device, in which liquid crystals and RM material are blended to form a liquid crystal layer.

FIG. 16 is a cross-sectional view illustrating an exemplary embodiment of a generation of a remaining reactive mesogen layer in the LCD device which liquid crystals and reactive mesogen material are blended to form a liquid crystal layer 580. in FIG. 16, a hatched pattern represents a liquid crystal molecule, and a non-hatched pattern represents a reactive mesogen.

Referring to FIG. 16, different from the previously illustrated embodiment, instead of forming a RM layer by coating the reactive mesogen on a lower alignment layer 571 and an upper alignment layer 661, a light curing process may be performed at a mixture state of the RM into the liquid crystal layer 580. The light curing method for the RM will be designated as a "blend method," and the light curing method for the RM such as described for the previously illustrated embodiment will be designated as a "coating method" or "deposition method."

According to the blend method, as shown in FIG. 16, the reactive mesogen RM04 disposed at a relatively far distance from the lower alignment layer 571 and the upper alignment layer 661 is influenced by the lower alignment layer 571 and the upper alignment layer 661, rather than reactive mesogens RM02 and RM03 adjacent to and disposed closer to the lower alignment layer 571 and the upper alignment layer 661, respectively. In a manufacturing process, the adjacent reactive mesogens RM02 and RM03 are cured at a surface of the lower alignment layer 571 and the upper alignment layer 661 to form a lower RM layer 590 and an upper RM layer 690, respectively. However, the reactive mesogen RM04 disposed further from the lower alignment layer 571 and the upper alignment layer 661 is not cured, and remains in the liquid crystal layer 580.

An undesirable decreasing amount of liquid crystal alignment capability due to the remaining reactive mesogen RM04 in the liquid crystal layer 580, is called as an alignment losing ratio. The alignment losing ratio depends upon not only characteristics of liquid crystal composition such as elasticity and viscosity, but also depends upon a chemical composition of the lower alignment layer 571 and the upper alignment layer 661, and characteristics of pattern formed on an alignment layer.

Figure 17:
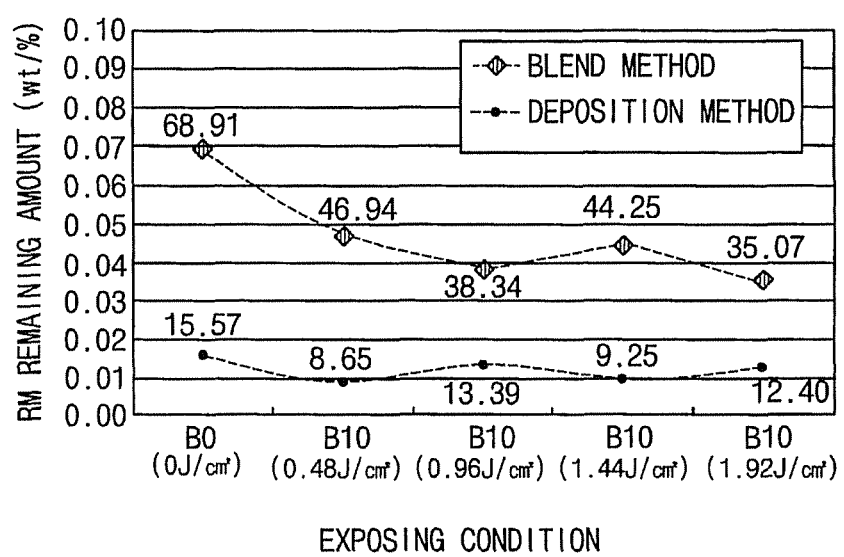
FIG. 17 is a graph illustrating a relationship between amounts of the RM remaining in the liquid crystal layer of the LCD device as described in FIG. 16 and an exposing time, and amounts of the RM remaining at the liquid crystal layer of the LCD device as described in FIGS. 1 to 15 and an exposing time.

FIG. 17 is a graph illustrating a relationship between an amount of the RM which is remaining in the liquid crystal layer 580 of the LCD device as described in FIG. 16 (blend method) and an exposing time, and an amount of the RM which is remaining in the liquid crystal layer of the LCD device as described in FIGS. 1 to 15 (deposition method) and an exposing time.

In FIG. 17, a horizontal axis represents an exposing strength ($J/cm^2$) of a UV light used to a light curing process for the RM, and a vertical axis represents a mass ratio of RM amount which is not cured after a light curing process and remains within the liquid crystal layer 580 with respect to a mass of an initially inputted RM. The RM remaining amount corresponding to the blend method (FIG. 16) is based on an amount of mixture RM of the liquid crystal layer 580, and the RM remaining amount corresponding to a coating method (FIGS. 1-15) is based on an amount of RM included in the lower RM layer 190 and the upper RM layer 290.

As shown in FIG. 17, observing the graph of the RM remaining amount of the blend method of FIG. 16, the RM remaining amount is gradually decreased as a time increases, such as shown that the RM remaining amount is close to about 35 weight percent (wt %). That is, even though an exposing time is relatively long, it is recognized the RM remaining amount decreases close to a uniform threshold value, that is, the RM remaining amount does not continuously decrease.

When observing the graph of RM remaining amount of a coating method of FIGS. 7-15, the RM remaining amount is about 15 wt % initially, and it is shown that the RM remaining amount is maintained to be about 12 wt % after the coating process is completed. That is, the RM is diffused into the liquid crystal layer 180 through the coating method, however, the RM remaining amount is about ⅓ of the blend method. Thus, in the coating method, the decreasing of display quality due to the remaining reactive mesogen RM04 may be reduced or effectively prevented since the RM remaining amount is about ⅓ of the blend method.

An LCD structure including a remaining amount of reactive mesogen in the liquid crystal layer may be formed using an exemplary embodiment of the light curing method for the RM, designated as a "blend method," and an exemplary embodiments of the light curing method for the RM designated as a "coating method" or "deposition method." The remaining amount of reactive mesogen in the liquid crystal layer is considered as a distinctive structural characteristic of the LCD.

Since the remaining amount of reactive mesogen in the liquid crystal layer is imparted by forming a reactive mesogen layer on an alignment layer of a first substrate, disposing a liquid crystal layer on the lower alignment layer, combining the first substrate with a second substrate and irradiating the combined substrates to generate a pretilt angle in the liquid crystal layer of the coating method, such a process is considered as imparting the distinct structural characteristic of the remaining amount of reactive mesogen in the liquid crystal layer. Additionally, since the remaining amount of reactive mesogen in the liquid crystal layer is imparted by form a reactive mesogen layer through coating a mixture of the reactive mesogen and liquid crystal on a lower alignment layer and an upper alignment layer, and light curing the mixture state of the RM into the liquid crystal layer, such a process is also considered as imparting the distinct structural characteristic of the remaining amount of reactive mesogen in the liquid crystal layer.

Figure 18A:
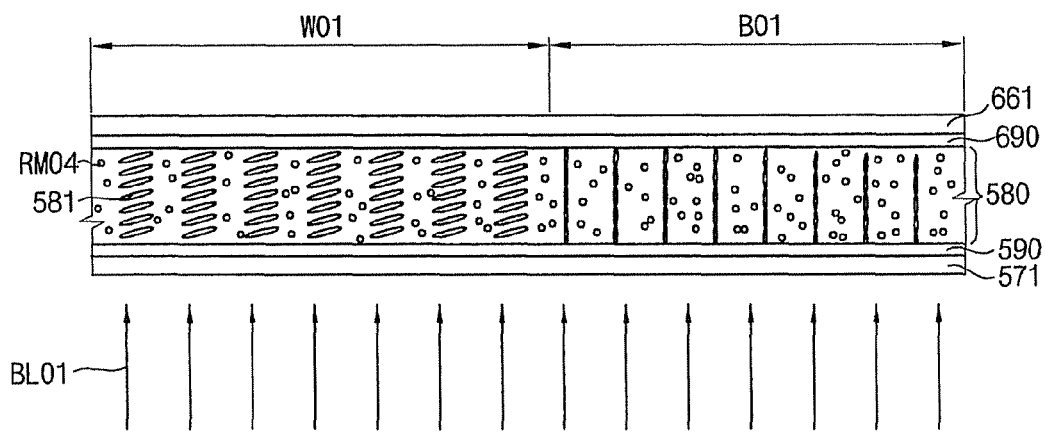
FIGS. 18A and 18B are cross-sectional views illustrating exemplary embodiments of a pretilt angle of liquid crystal molecules at a black driving area and a white driving area of an LCD device manufactured by the blending method.
Figure 18B:
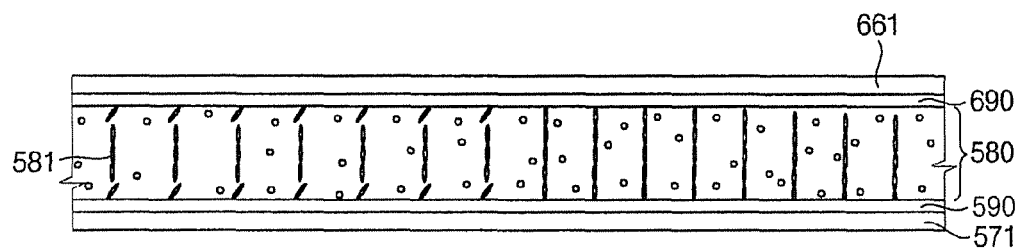

FIGS. 18A and 18B are cross-sectional views illustrating an exemplary embodiment of a pretilt angle of liquid crystal molecules at a black driving area B01 and a white driving area W01, of an LCD device manufactured by the blending method as described in FIG. 16.

Referring to FIGS. 18A and 18B, the liquid crystal 581 is substantially vertically aligned and backlight (indicated by the upward arrows) is blocked at a black driving area B01 of the LCD device manufactured by the blend method, so that black is displayed. The liquid crystal 581 is substantially horizontally aligned and backlight is transmitted at a white driving area W01 of the LCD device manufactured by the blend method, so that white is displayed. In the blend method, the remaining RM RM04 of the liquid crystal layer 580 responds to the backlight BL01 during the black driving and the white driving, and then the remaining RM RM04 is additionally cured at a surface of the lower RM layer 590 and the upper RM layer 690. Accordingly, a pretilt angle of the liquid crystal 581 is altered at a surface of the lower RM layer 590 and the upper RM layer 690.

Additional curing amounts of the RM are different from each other at the black driving area B01 and the white driving area W01. Thus, as shown in FIG. 18B, when an electric field is turned off, that is, even though a total display screen is displayed in black, pretilt angles of the liquid crystal 581 may be different from each other at the black driving area B01 and areas which were the white driving area W01.

Figure 19A:
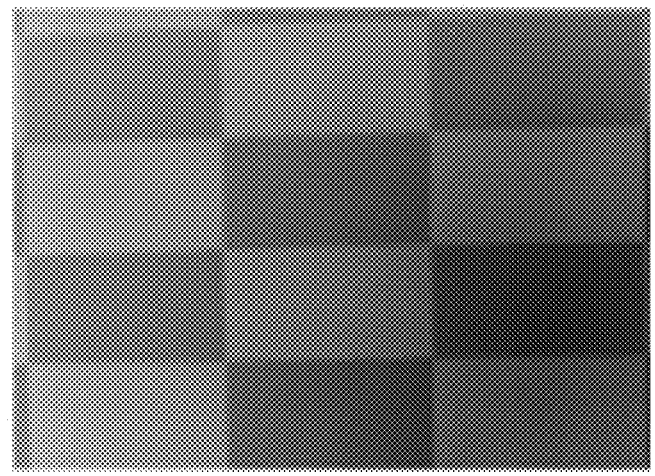
FIGS. 19A and 19B are photographs illustrating exemplary embodiments of a display screen of the LCD device manufactured by the blending method as described in FIG. 16.
Figure 19B:
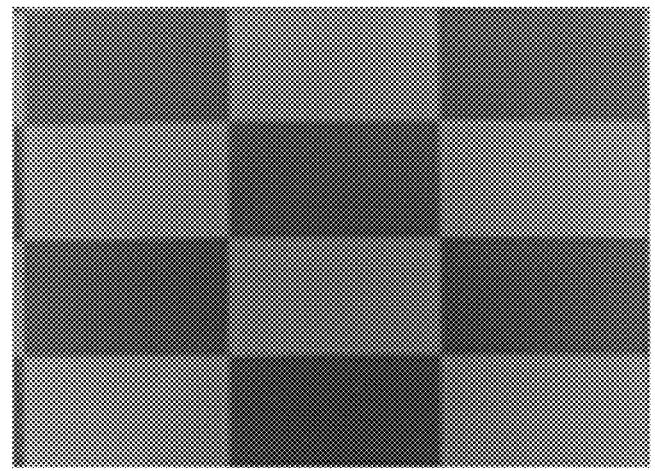

FIGS. 19A and 19B are photographs illustrating an exemplary embodiment of a display screen of the LCD device manufactured by the blending method as described in FIG. 16. FIG. 19A shows a display screen that is observed when a total display screen is displayed in black after the white driving area W01 is driven in about 220-gray with respect to the black driving area B01 for about 24 hours at a peripheral temperature of about 50 Celsius degrees. FIG. 19B shows a display screen that is observed when a total display screen is displayed in black after the white driving area W01 is driven in about 245-gray with respect to the black driving area B01 for about 168 hours at a peripheral temperature of about 50 Celsius degrees.

Referring to FIGS. 19A and 19B, in the aforementioned blend method, pretilt angles of the liquid crystal 581 are different from each other in accordance with the black driving area B01 and the white driving area W01, so that a gradation displayed at a black status may be different from each other in accordance with areas and lapse time. Therefore, an undesirable afterimage may be clearly observed on the display screen. That is, display quality may be greatly decreased.

Figure 20A:
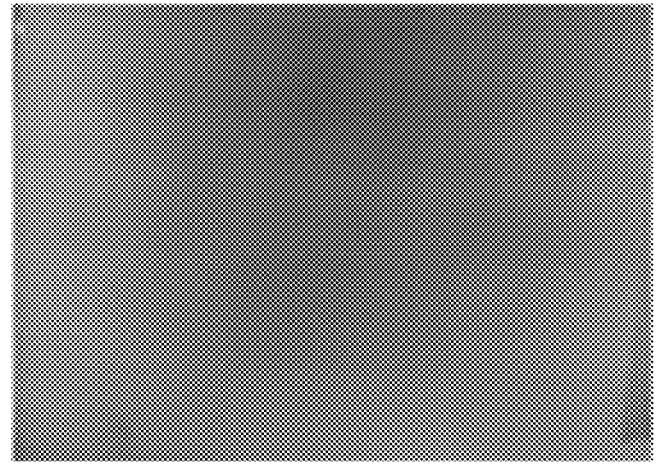
FIGS. 20A and 20B are photographs illustrating a display screen of the LCD device as described in FIGS. 1 to 15.
Figure 20B:
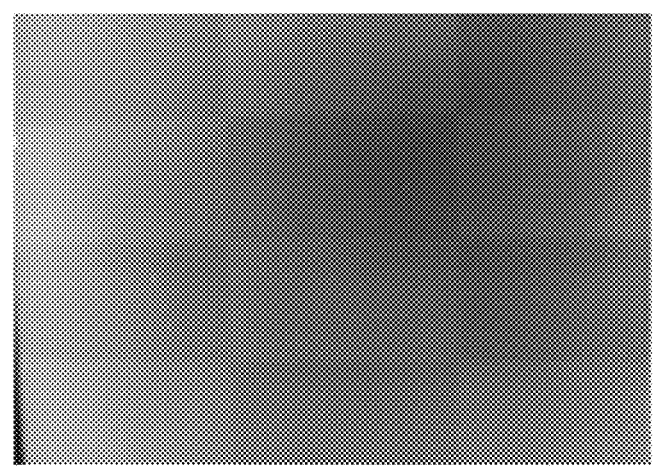

FIGS. 20A and 20B are photographs illustrating a display screen of the LCD device as described in FIGS. 1 to 15. FIG. 20A shows a display screen that is observed when a total display screen is displayed in black after the white driving area W01 is driven in about 90-gray with respect to the black driving area B01 for about 24 hours at a peripheral temperature of about 50 Celsius degrees. FIG. 20B shows a display screen that is observed when a total display screen is displayed in black after the white driving area W01 is driven in about 180-gray to about 200-gray with respect to the black driving area B01 for about 168 hours at a peripheral temperature of about 50 Celsius degrees.

Referring to FIGS. 20A and 20B, the remaining RM RM04 within the liquid crystal layer 180 is decreased in a coating method such as the present embodiment, so that an additional curing of the reactive mesogen due to the backlight BL01 at the black driving area B01 and the white driving area W01 while an LCD device is driven is not generated. Thus, the pretilt angle of the liquid crystal 181 may be uniform in accordance with areas. As a result, it is recognized that an afterimage is not viewed even though a lapse time is about 168 hours as shown in FIG. 20B.

According to exemplary embodiment of an LCD device and a method of manufacturing the LCD device, in an LCD device which allows a pretilt angle by using a reactive mesogen, the remaining reactive mesogen remaining within a liquid crystal layer may be decreased. Advantageously, an afterimage due to the remaining reactive mesogen in a display screen may be removed, so that display quality may be enhanced. Therefore, the illustrated embodiments may be adapted to an LCD device using a reactive mesogen.

The foregoing is illustrative of the present invention and is not to be construed as limiting thereof. Although exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A liquid crystal display, comprising:
a first substrate;
a plurality of pixels disposed in a matrix on the first substrate, a pixel comprising a first pixel electrode electrically connected to at least one of a first transistor and a second transistor and a second pixel electrode electrically connected to at least one of the first transistor and the second transistor, wherein the first pixel electrode and the second pixel electrode are separated from each other;
a second substrate facing the first substrate and having a common electrode;
a data line extending in a first direction;
a gate line extending in a second direction;
a storage line extending parallel with the gate line and comprising a first branch portion extending parallel with the data line;
a liquid crystal layer interposed between the first substrate and the second substrate, and comprising a plurality of liquid crystal molecules;
an alignment layer member comprising:
a photopolymerized material,
a lower alignment layer disposed between the first pixel electrode and the liquid crystal layer, and the second pixel electrode and the liquid crystal layer, the lower alignment layer comprising a lower reactive mesogen layer disposed on the first and second pixel electrodes, wherein the lower alignment layer induces an inclined direction of liquid crystal molecules, and
an upper alignment layer disposed between the common electrode and the liquid crystal layer, the upper alignment layer comprising an upper reactive mesogen layer disposed between the common electrode and the liquid crystal layer, and
a diffusion stop layer disposed on inner surfaces of the lower reactive mesogen layer and the upper reactive mesogen layer to block the lower reactive mesogen layer and the upper reactive mesogen layer from being diffused to the liquid crystal layer,
wherein the liquid crystal layer on at least one of the first pixel electrode and the second pixel electrode is divided into at least four domains, wherein a domain is defined by an orientation direction of liquid crystal molecules when a voltage is applied to the at least one of the first pixel electrode and the second pixel electrode,
wherein an electric field generated between the first pixel electrode and the common electrode is different from an electric field generated between the second pixel electrode and the common electrode, and
wherein the liquid crystal molecules are vertically aligned with the first substrate in the absence of the electric field.

2. The liquid crystal display of claim 1, wherein
the first pixel electrode and the second pixel electrode respectively receive different pixel voltages, and
the first and second pixel electrodes each comprise slit portions disposed in the domains of the first and second pixel electrodes and elongated in different extending directions, respectively.

3. The liquid crystal display of claim 2, wherein the common electrode disposed facing the first and second pixel electrodes has a substantially flat plate shape in which an opening is not disposed.

4. The liquid crystal display of claim 2, wherein the lower alignment layer and the upper alignment layer are aligned to arrange a long axis of the liquid crystal molecules in the extending direction of the slit portion at each of the domains when an electric field applied to the liquid crystal layer is turned off.

5. The liquid crystal display of claim 1, wherein the lower alignment layer and the upper alignment layer are aligned to vertically arrange a long axis of the liquid crystal molecules when the electric field applied to the liquid crystal layer is turned off.

6. The liquid crystal display of claim 1, wherein the storage line further comprises a second branch portion extending parallel with the data line, and the second branch portion is spaced apart from the first branch portion.

7. A liquid crystal display, comprising:
a first substrate;
a plurality of pixels disposed in a matrix on the first substrate, a pixel comprising a first pixel electrode electrically connected to at least one of a first transistor and a second transistor and a second pixel electrode electrically connected to at least one of the first transistor and the second transistor, wherein the first pixel electrode and the second pixel electrode are separated from each other;
a second substrate facing the first substrate and having a common electrode;
a data line extending in a first direction;
a gate line extending in a second direction;
a storage line extending parallel with the gate line and comprising a first branch portion extending parallel with the data line;
a liquid crystal layer interposed between the first substrate and the second substrate, and comprising a plurality of liquid crystal molecules;
an alignment layer member comprising
a photoreactive polymer,
a lower alignment layer disposed between the first pixel electrode and the liquid crystal layer, and between the second pixel electrode and the liquid crystal layer, the lower alignment layer comprising a lower reactive mesogen layer disposed on the first and second pixel electrodes, wherein the lower alignment layer induces an inclined direction of liquid crystal molecules, and an upper alignment layer disposed between the common electrode and the liquid crystal layer, the upper alignment layer comprising an upper reactive mesogen layer disposed between the common electrode and the liquid crystal layer; and a diffusion stop layer disposed on inner surfaces of the lower reactive mesogen layer and the upper reactive mesogen layer to block the lower reactive mesogen layer and the upper reactive mesogen layer from being diffused to the liquid crystal layer, wherein the liquid crystal layer on at least one of the first pixel electrode and the second pixel electrode is divided into at least four domains, wherein a domain is defined by an orientation direction of liquid crystal molecules when a voltage is applied to the at least one of the first pixel electrode and the second pixel electrode, wherein an electric field generated between the first pixel electrode and the common electrode is different from an electric field generated between the second pixel electrode and the common electrode, and wherein the liquid crystal molecules are vertically aligned with the first substrate in the absence of the electric field.

* * * * *